United States Patent
DeLuca et al.

(10) Patent No.: US 9,860,336 B2
(45) Date of Patent: Jan. 2, 2018

(54) MITIGATING SERVICE DISRUPTIONS USING MOBILE PREFETCHING BASED ON PREDICTED DEAD SPOTS

(71) Applicant: International Business Machines Corporation, Armonk, NY (US)

(72) Inventors: Lisa Seacat DeLuca, Baltimore, MD (US); Geetika T. Lakshmanan, Winchester, MA (US); Dana L. Price, Surf City, NC (US); Shelbee D. Smith-Eigenbrode, Thronton, CO (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 14/926,159

(22) Filed: Oct. 29, 2015

(65) Prior Publication Data

US 2017/0126833 A1    May 4, 2017

(51) Int. Cl.
| | | |
|---|---|---|
| G06F 15/16 | (2006.01) | |
| G06F 15/173 | (2006.01) | |
| H04L 29/08 | (2006.01) | |
| H04W 4/02 | (2009.01) | |

(52) U.S. Cl.
CPC ...... *H04L 67/2847* (2013.01); *H04L 67/2852* (2013.01); *H04W 4/028* (2013.01)

(58) Field of Classification Search
USPC ....... 709/203, 206, 217, 216, 223, 224, 226, 709/228, 231, 232, 238; 705/37; 706/52; 1/1
See application file for complete search history.

(56) References Cited

U.S. PATENT DOCUMENTS

| | | | |
|---|---|---|---|
| 8,117,303 B2 | 2/2012 | Fonsen | |
| 8,311,741 B1 | 11/2012 | Lawther et al. | |
| 8,762,482 B2 | 6/2014 | Raghunathan et al. | |
| 9,615,333 B2 * | 4/2017 | Brown | H04W 52/0261 |
| 9,633,316 B2 * | 4/2017 | Pliner | G06N 99/005 |

(Continued)

FOREIGN PATENT DOCUMENTS

WO    2007139542 A1    12/2007

OTHER PUBLICATIONS

Weber, Benjamin, "Mobile Map Browsers: Anticipated User Interaction for Data Pre-Fetching", A Thesis, The Graduate School, The University of Maine, Dec. 2010, © 2010 Benjamin T. Weber, pp. 1-113.

*Primary Examiner* — Quang N Nguyen
(74) *Attorney, Agent, or Firm* — Gilbert Harmon, Jr.

(57) ABSTRACT

An approach to downloading content to a mobile device based on predicted service disruptions to avoid a loss of access to content. The service disruptions to wireless network connectivity can occur due to network dead spots, such as those occurring on a highway, in a tunnel, under a bridge or in a building. Embodiments monitor current and historical mobile device usage and historical wireless service data to form a history and generate a predictive model that makes predictions regarding anticipated dead spots and the types and quantity of content that will be requested during the dead spots. Decisions based on the predictive model can be made automatically by embodiments, such as when to start downloading content prior to entering a dead spot and how much content and what types of content will be downloaded based on predicted user requests.

15 Claims, 4 Drawing Sheets

(56) References Cited

U.S. PATENT DOCUMENTS

| | | | |
|---|---|---|---|
| 2009/0023456 A1 | 1/2009 | Seacat et al. | |
| 2011/0288936 A1 | 11/2011 | Cumming | |
| 2012/0296799 A1* | 11/2012 | Playfair | G06Q 10/00 705/37 |
| 2014/0095943 A1 | 4/2014 | Kohlenberg et al. | |
| 2014/0113600 A1 | 4/2014 | El Gamal et al. | |
| 2015/0244645 A1* | 8/2015 | Lindo | H04L 47/823 709/224 |
| 2015/0332156 A1* | 11/2015 | Pliner | G06Q 30/00 706/52 |
| 2016/0341564 A1* | 11/2016 | Cheng | G01C 21/3641 |

* cited by examiner

MITIGATING SERVICE DISRUPTIONS USING MOBILE PREFETCHING BASED ON PREDICTED DEAD SPOTS

BACKGROUND

The present invention relates generally to the field of mobile service disruptions, and more particularly to content prefetching based on predicted dead spots.

Interruptions to cellular service, known as dead spots, can occur for mobile device users when entering a zone where cellular service is out of range of a cellular data transmitter (i.e., a cell tower), or where some material in the environment is interfering with the signal transmitting the data. In order to avoid a loss of accessibility to content, such as data available from the internet, the content can be retrieved and stored in local memory prior to the loss of cellular service so that a mobile device user can have uninterrupted access to the content even while in a dead spot.

SUMMARY

According to one embodiment of the present invention, a method for downloading content to a mobile device based on predicted service disruptions is provided, the method comprising: monitoring usage of a mobile device to form a history of usage and disruptions to a wireless service based on a user routine; generating a predictive model based on the history of usage and disruptions to the wireless service; utilizing the predictive model to identify one or more types and a quantity of content to download before a predicted service disruption; and downloading the content to the mobile device before the predicted service disruption. A corresponding computer program product and computer system are also disclosed herein.

DETAILED DESCRIPTION

Embodiments of the present invention recognize that disruptions to cellular service caused by "dead spots" in a wireless cellular or Wi-Fi network can lead to reduced productivity by mobile device users due to an unavailability of web based content, such as, for example, email or business applications using data from the internet. These dead spots may be due, for example, to the mobile device being out of range of any nearby network transmitters, the wireless signal being blocked by some material in the surroundings of the device (e.g., under a bridge, in a tunnel or a building, etc . . . ), planned service and/or utility outages and adverse weather conditions. With this in mind, embodiments of the present invention provide an efficient solution to this problem wherein wireless network dead spots are predicted ahead of time and the type and quantity of content that a mobile device user will request during that time is predicted, prefetched (i.e., downloaded ahead of time) and then deleted from the device after leaving the dead spot and resuming regular network access. This can be accomplished by an intelligent learning system that can analyze factors such as historical service data for the mobile device and historical content usage by the mobile device user, both of which can be based on regular routines of the mobile device user.

Embodiments of the present invention provide a solution that is efficient with respect to wireless data usage, memory capacity and battery life for a mobile device, which are important considerations for mobile device users. The intelligent learning system monitors mobile device usage and historical service data and makes adjustments to the predicted content needs of the user in order to provide just as much content as needed in a dead spot while preventing excess data consumption and memory allocation and conserving battery life.

It should be noted that although the disclosure provided herein refers to embodiments primarily as they apply to wireless cellular networks, other embodiments can be configured to work with other wireless networks that involve data transfer, e.g., a Wi-Fi network. Further, the term "prefetch" used herein is meant to be interchangeable with "download," i.e., content that is "prefetched" is downloaded prior to the occurrence of a dead spot.

Figure 1A:
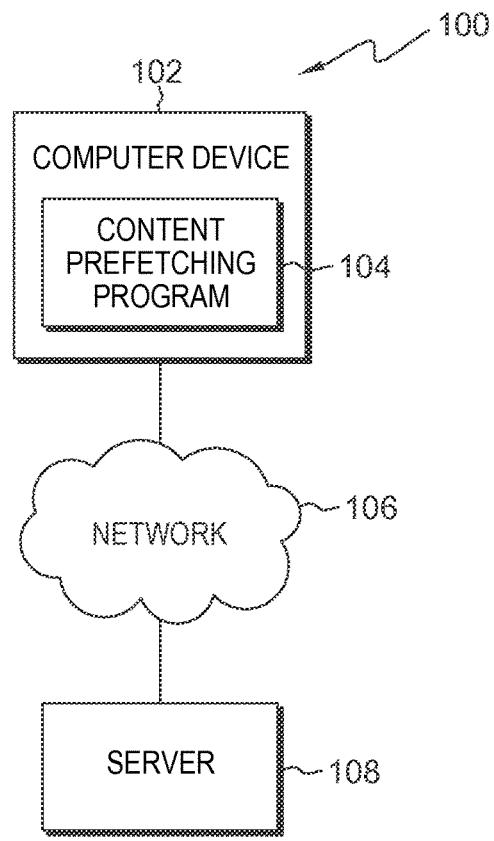
FIG. 1A-B is a functional block diagram illustrating a distributed data processing environment and a functional block diagram depicting components of a content prefetching program, respectively, in accordance with an embodiment of the present invention.

The present invention will now be described in detail with reference to the figures. FIG. 1A is a functional block diagram illustrating a distributed data processing environment 100, in accordance with one embodiment of the present invention. Distributed data processing environment includes computing device 102 and server 108, interconnected over network 106.

Computing device 102 can be a laptop computer, tablet computer, netbook computer, personal computer (PC), a desktop computer, a personal digital assistant (PDA), a smart phone, or any programmable electronic device capable of communicating with server 108 via network 106. Computing device 102 comprises content prefetching program 104, which predicts when computing device 102 is entering a dead spot, predicts the duration of time that will be spent in the dead spot and prefetches the type and quantity of content from server 108 that is predicted to be requested by the user. Content prefetching program 104 can be a component of computing device 102 or can be downloaded as an application via network 106 and can be in communication with other applications on computing device 102 and have access to system level data that can be analyzed for making predictions. Computing device 102 can include internal and external hardware components, as depicted and described in further detail with respect to FIG. 4.

Network 106 can be, for example, a local area network (LAN), a wide area network (WAN) such as the Internet, or a combination of the two, and can include wired, wireless, or fiber optic connections. In general, network 106 can be any combination of connections and protocols that will support communications between computing device 102 and server 108. Server 108 can be any computer system such as, but not limited to, a web server for a particular web site, that serves requests for web based content.

Figure 1B:
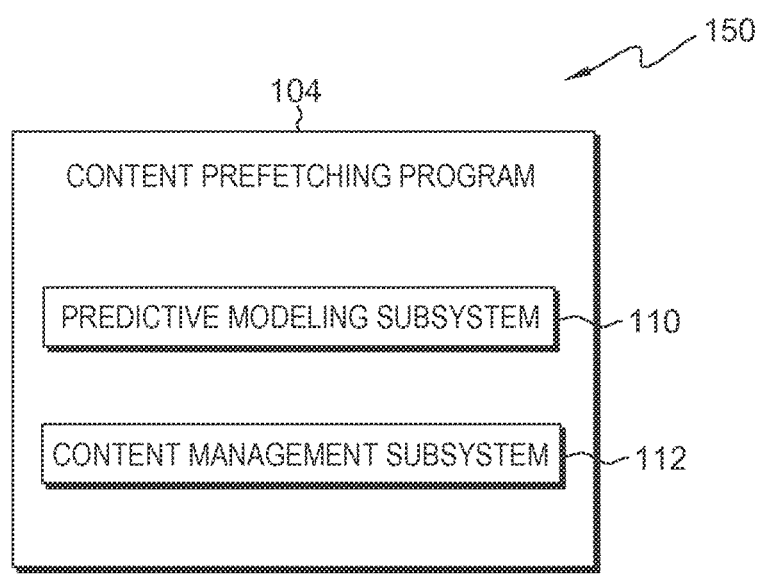

FIG. 1B is a functional block diagram 150 illustrating components of content prefetching program 104, in accordance with an embodiment of the present invention. Content prefetching program 104 comprises predictive modeling subsystem 110 and content management subsystem 112. Predictive modeling subsystem 110 can communicate with other applications on computing device 102 and have access to system level data related to, for example, historical cellular service data and historical application and/or content usage, which can be based on daily routines of the user of computing device 102. Predictive modeling subsystem 110 monitors the system level data to determine dates and times that certain applications are used and/or a certain type and quantity of content is requested by the user and can also determine dates and times when cellular service has been lost and the duration of time for which it was lost. Altogether, this information can be used to generate a predictive model that has formed a history of device usage and service disruptions to predict when, on a given day, the user on computing device 102 is going to enter a dead spot, how long they will remain in that dead spot and what type and quantity of content will be downloaded ahead of time, i.e., prefetched, while they still have cellular service. Predictive modeling subsystem 110 can also decide how far in advance of entering a dead spot (e.g., 5 minutes, 10 minutes, etc . . . ) that content download must begin in order to fetch the quantity of content that has been predicted the user will need.

Content management subsystem 112 is configured to communicate with predictive modeling subsystem 110 and prefetch and manage the appropriate content that predictive modeling subsystem 110 has predicted the user will need in a dead spot. Content downloaded by content management subsystem 112 can be stored on local memory, such as, but not limited to, cache memory, and it should be noted that local memory can refer to any form of data storage on computing device 102. Content management subsystem 112 is further configured to detect when computing device 102 is out of a dead spot and resumes normal access to the cellular network, in which case the downloaded content can be automatically deleted from local memory.

Some examples of types of content that can be prefetched by embodiments of the present invention can include, but are not limited to, text, images, videos, style sheets, JavaScript, documents and e-books. Further, the content that is prefetched can be based on the current usage of computing device 102 by a user, such as for open and/or active applications. For example, a user may be browsing a certain web page but is predicted to shortly be entering a dead spot. In such an instance, linked web pages (available via URLS on the web page) and resources (e.g., images) on the web page and/or any linked web pages can be preemptively downloaded, in anticipation that the user may wish to have access to them when the network outage occurs. This preemptive downloading based on current device usage can be configured to occur automatically or can be manually initiated by the user or managed by preferences set by the user.

It should also be noted that a user can create a prioritization order of types of content to be downloaded prior to a dead spot. For example, a user can configure content prefetching program 104 to prioritize text over images and images over videos when deciding what content to prefetch in anticipation of a dead spot. In addition, a user can specify certain types of undesired content which they do not want to have during a dead spot (e.g., advertisements and large images, such as those larger than 10 MB in size, for example) which can be replaced with generic, default placeholder data (such as a preloaded icon or image) and/or they can select certain websites and/or applications for which content will not be prefetched. Any features, variations to operation and/or user preferences described herein can be manually set in a provided user interface (UI) module, as will be discussed subsequently.

Figure 2:
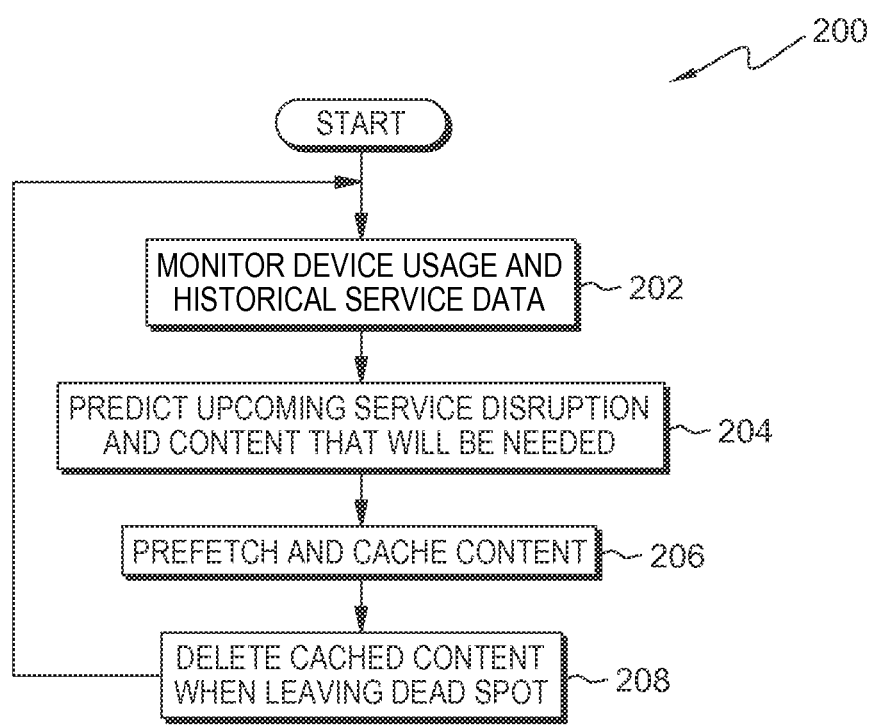
FIG. 2 is a flowchart depicting operational steps of a content prefetching program, in accordance with an embodiment of the present invention.

FIG. 2 is a flowchart 200 depicting operational steps of content prefetching program 104, in accordance with an embodiment of the present invention. Predictive modeling subsystem 110, at block 202, simultaneously monitors both historical cellular service data and historical application and/or content usage data on computing device 102 and these data are analyzed by predictive modeling subsystem 110, at block 204, to form a predictive model that can extrapolate when on a given day a dead spot will be entered, how long a user will remain in the dead spot and what content they will request during that time in the dead spot. The predictive model also decides how far ahead of time, prior to a predicted dead spot being entered, the content must begin downloading in order to download the appropriate amount of content, all of which can be based on the predicted user requests and predicted duration of the dead spot. Predictive modeling subsystem 110 sends information associated with the predictive model to content management subsystem 112 which, at block 206, downloads, prior to entering the dead spot, the appropriate type and quantity of content to be stored in local memory on computing device 102. When content management subsystem 112 detects that computing device 102 is out of the dead spot and has regained cellular service, the content downloaded to local memory is deleted automatically, at block 208. After the downloaded content is deleted, embodiments continue to monitor, at block 202, historical service data and device usage data.

It should be understood that predictive modeling subsystem 110 can be an intelligent learning system wherein usage statistics and data pertaining to how a user interacted with their mobile device while in a dead spot are gathered and analyzed to refine the quality of predictions. For example, if an analysis of the usage statistics reveals the user is requesting more content than has been previously downloaded prior to entering a dead spot, embodiments can, for example, automatically increase the amount of content that is prefetched and/or automatically increase the amount of time before a predicted dead spot that the prefetching begins in the future. Alternatively, if the analysis reveals that a greater amount content has been previously downloaded than was requested by the user in a dead spot, the amount of content that is prefetched can be automatically adjusted to be less, minimizing excess data consumption in the future. Further, if the type of content that is being prefetched is not being requested by the user in a dead spot, whereas the analysis reveals they are historically requesting different content instead, embodiments can make automatic adjustments to predictions wherein prefetched content is more relevant to what the user historically requests.

An analysis of historical device usage and service disruptions can be based on a predetermined criteria, which can be user configured. As an illustrative example according to one embodiment, a history of service disruptions and device usage can be formed based on an analysis of data related to service disruptions and device usage from the past week (i.e., seven days) and further based on an analysis of data related to device usage within ten minutes prior to a service disruption and during the duration of the service disruption (from within the past seven days).

Content prefetching program 104 can provide a UI module that allows a user to manually control settings related to its operation. A user can set a policy wherein the settings and/or user preferences that can be adjusted can include, but are not limited to, options related to content pre-fetching, content storage, removal of downloaded content, place holder data and decisions made automatically by the intelligent learning system of predictive modeling subsystem 110.

In some embodiments, suggestions associated with the configuring of settings can be generated by predictive modeling subsystem 110 and presented to the user of computing device 102. As an example, if the user is trying to browse content which has not been prefetched while in a dead spot, a suggestion can be made that the user instead explore other available content that has been prefetched. Additionally, if an analysis of historical content usage data reveals that certain types of content are being prefetched which are not requested by the user, such as videos for one example, a suggestion can be presented to the user that they manually configure the types of content which are not to be prefetched, i.e., videos for this example. These examples are meant to be illustrative with regard to possible suggestions that can be generated and are not intended to be restrictive or limiting in any manner.

It is also noteworthy that embodiments of the present invention can work in conjunction with other applications and/or services to make predictions related to service disruptions. Some examples of such applications and/or services can include, but are not limited to, map applications with GPS functionality, an internet browser, a map of network dead spots, social media applications, weather applications, traffic applications and/or information pertaining to planned outages of utilities for a local area. Any of these applications and/or services can be internet based and/or make use of a GPS service. As an illustrative example, if predictive modeling subsystem 110 detects, based on communications with a map application with GPS functionality (that is tracking the location of computing device 102) and an analysis of a map of network dead spots, that computing device 102 is projected to be entering a dead spot, predictive modeling subsystem 110 can begin making decisions, as previously discussed, related to the prefetching of content.

It should also be noted that in a further aspect according to some embodiments, a peer to peer network capability (based on a predetermined criteria) can be embodied, wherein computing device 102 can use another users mobile device to make requests for content during a service disruption, provided that the other user still has access to cellular service during the service disruption and has agreed to enable such a capability on their device. This peer to peer networking capability can be another configurable option provided by the UI module previously discussed and can be used either prior to or during a dead spot provided that the other user has service when the requests are made.

Figure 3:
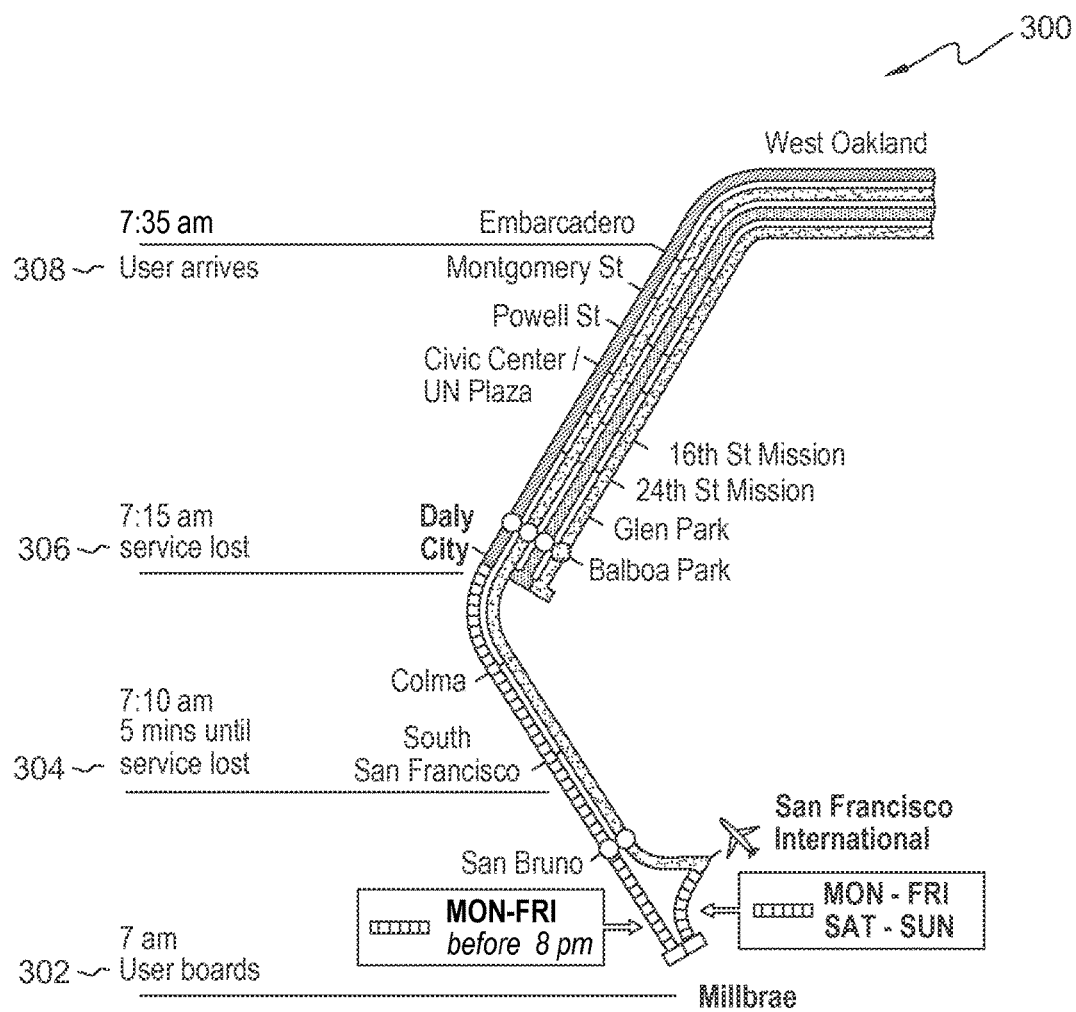
FIG. 3 illustrates an example use case of a content prefetching program, in accordance with an embodiment of the present invention.

Turning to FIG. 3, an example use case 300 of content prefetching program 104 is presented, in accordance with an embodiment of the present invention. Example use case 300 is a graphic depiction of the daily commute of a mobile device (i.e., computing device 102) user who experiences a cellular service outage everyday due to a network dead spot occurring along the route. The user boards 302 a subway at 7 A.M. every morning to go to work, Monday through Friday, and the subway route has a network dead spot occurring along it, due to the subway going through a tunnel. Based on an analysis of historical service data and device usage on computing device 102, which are associated with the users normal morning routine, predictive modeling subsystem 110 has formed a predictive model and determines that cellular service will be lost at approximately 7:15 A.M. and therefore begins prefetching the content, which the user is predicted to request, at 7:10 A.M., five minutes before service is lost 304. Cellular service on computing device 102 is lost 306 at 7:15 A.M. and the user has access to prefetched content such as, for example, email and business applications, which they would normally request at this time before heading into work. The user arrives 308 at their destination at 7:35 A.M., is now out of the dead spot and has regained network access. Accordingly, any prefetched content is automatically deleted from local memory on computing device 102, unless content prefetching program 104 has been otherwise configured by the user.

Figure 4:
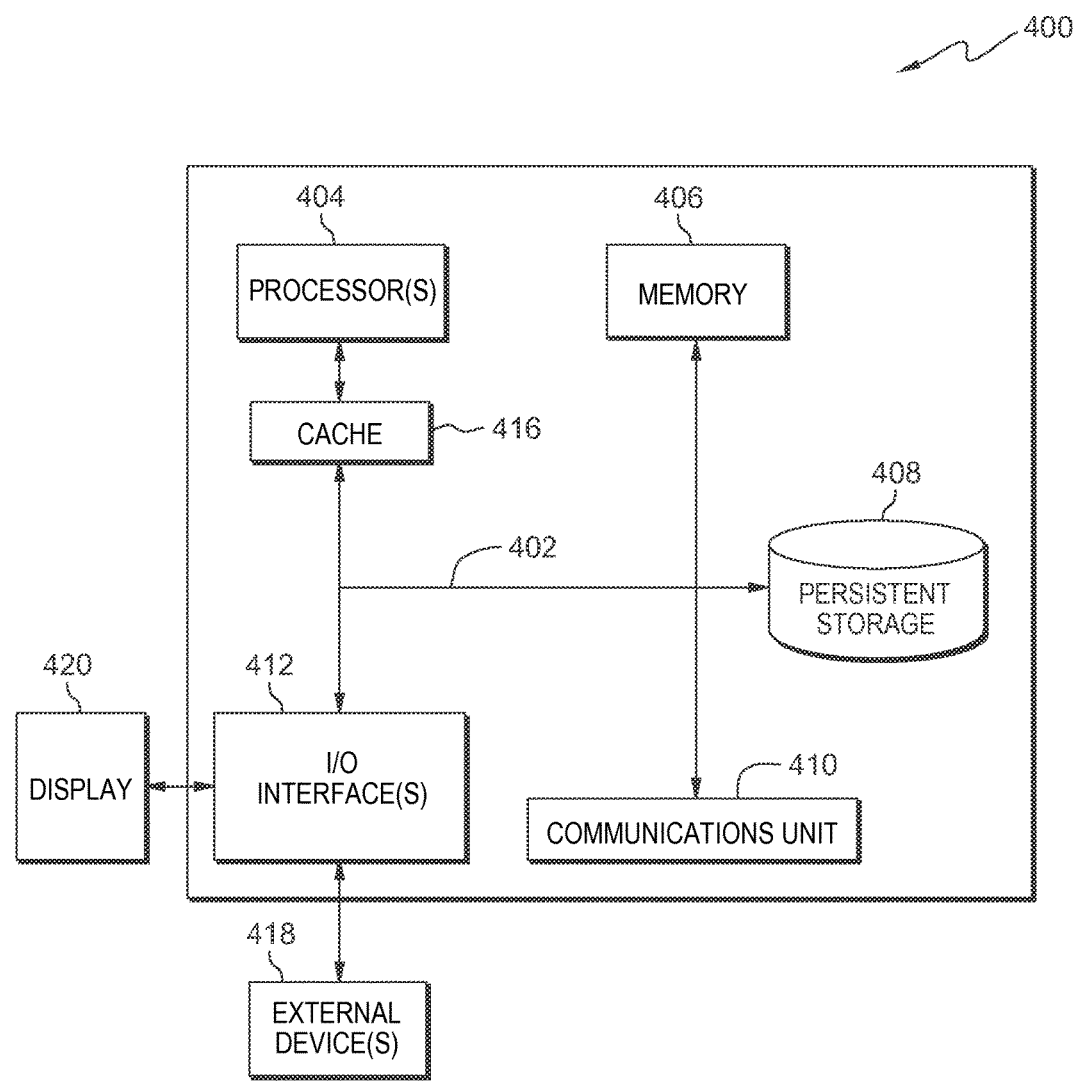
FIG. 4 sets forth a generalized architecture of computing platforms suitable for at least one embodiment of the present invention.

FIG. 4 depicts a block diagram 400 of components of computing device 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 102 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Content prefetching program 104 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Content prefetching program 104 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., content prefetching program 104, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for downloading content to a mobile device based on predicted service disruptions, the method comprising:

monitoring usage of a mobile device to form a history of usage and disruptions to a wireless service based on a user routine;
   generating a predictive model based on the history of usage and disruptions to the wireless service;
   utilizing the predictive model to identify one or more types and a quantity of content to download before a predicted service disruption;
   downloading the content to the mobile device before the predicted service disruption; and
   providing a user interface for a user to manually configure one or more settings wherein the one or more settings comprise options associated with content pre-fetching, content storage, removal of downloaded content, place holder data and decisions made by an intelligent learning system;
   wherein a user can select content not to be downloaded before a predicted service disruption, wherein the selected content is at least one of content associated with a web page and content associated with a mobile application.

2. The method of claim 1, wherein the wireless service is at least one of a cellular network and a Wi-Fi network.

3. The method of claim 1, wherein the content is at least one of text, images, videos, style sheets, JavaScript, documents and e-books.

4. The method of claim 1, wherein generic placeholder data is used in place of undesired content.

5. The method of claim 1, wherein a user can configure a prioritization order of types of content to be downloaded.

6. A computer program product for downloading content to a mobile device based on predicted service disruptions, the computer program product comprising: one or more non-transitory computer readable storage media and program instructions stored on the one or more non-transitory computer readable storage media, the program instructions comprising:

program instructions to monitor usage of a mobile device to form a history of usage and disruptions to a wireless service based on a user routine;
   program instructions to generate a predictive model based on the history of usage and disruptions to the wireless service;
   program instructions to utilize the predictive model to identify one or more types and a quantity of content to download before a predicted service disruption;
   program instructions to download the content to the mobile device before the predicted service disruption; and
   program instructions to provide a user interface for a user to manually configure one or more settings wherein the one or more settings comprise options associated with content pre-fetching, content storage, removal of downloaded content, place holder data and decisions made by an intelligent learning system;
   wherein a user can select content not to be downloaded before a predicted service disruption, wherein the selected content is at least one of content associated with a web page and content associated with a mobile application.

7. The computer program product of claim 6, wherein the wireless service is at least one of a cellular network and a Wi-Fi network.

8. The computer program product of claim 6, wherein the content is at least one of text, images, videos, style sheets, JavaScript, documents and e-books.

9. The computer program product of claim 6, wherein generic placeholder data is used in place of undesired content.

10. The computer program product of claim 6, wherein a user can configure a prioritization order of types of content to be downloaded.

11. A computer system for downloading content to a mobile device based on predicted service disruptions, the computer system comprising:

one or more computer processors;
   one or more computer readable storage media;
   program instructions stored on the one or more computer readable storage media for execution by at least one of the one or more processors, the program instructions comprising:
      program instructions to monitor usage of a mobile device to form a history of usage and disruptions to a wireless service based on a user routine;
      program instructions to generate a predictive model based on the history of usage and disruptions to the wireless service;
      program instructions to utilize the predictive model to idetify one or more types and quantity of content to download before a predicted service disruption;
      program instructions to download the content to the mobile device before the predicted service disruption; and
      program instructions to provide a user interface for a user to manually configure one or more settings wherein the one or more settings comprise options associated with content pre-fetching, content storage, removal of downloaded content, place holder data and decisions made by an intelligent learning system;

wherein a user can select content not to be downloaded before a predicted service disruption, wherein the selected content is at least one of content associated with a web page and content associated with a mobile application.

12. The computer system of claim 11, wherein the wireless service is at least one of a cellular network and a Wi-Fi network.

13. The computer system of claim 11, wherein the content is at least one of text, images, videos, style sheets, JavaScript, documents and e-books.

14. The computer system of claim 11, wherein generic placeholder data is used in place of undesired content.

15. The computer system of claim 11, wherein a user can configure a prioritization order of types of content to be downloaded.

\* \* \* \* \*